United States Patent
Liu et al.

(10) Patent No.: US 8,550,640 B2
(45) Date of Patent: Oct. 8, 2013

(54) ANTIGLARE FILM HAVING RESIN-PHILIC AND RESIN-PHOBIC LIGHT SCATTERING PARTICLES

(75) Inventors: Bo-Tau Liu, Yunlin County (TW); Ya-Tsun Teng, Yunlin County (TW)

(73) Assignee: National Yunlin University of Science and Technology, Yunlin County (TW)

( * ) Notice: Subject to any disclaimer, the term of this patent is extended or adjusted under 35 U.S.C. 154(b) by 410 days.

(21) Appl. No.: 12/907,836

(22) Filed: Oct. 19, 2010

(65) Prior Publication Data

US 2012/0092773 A1 Apr. 19, 2012

(51) Int. Cl.
*G02B 27/00* (2006.01)

(52) U.S. Cl.
USPC .......................................... 359/601; 428/323

(58) Field of Classification Search
None
See application file for complete search history.

(56) References Cited

U.S. PATENT DOCUMENTS

| | | |
|---|---|---|
| 5,998,013 A | 12/1999 | Shoshi et al. |
| 6,217,176 B1 | 4/2001 | Maekawa |
| 6,613,426 B2 | 9/2003 | Onozawa et al. |
| 6,696,140 B2 | 2/2004 | Suzuki |
| 6,896,960 B2 | 5/2005 | Shoshi et al. |
| 7,008,066 B2 | 3/2006 | Suga et al. |
| 7,033,638 B2 | 4/2006 | Suzuki |
| 2005/0255291 A1* | 11/2005 | Iwata et al. ................... 428/141 |
| 2010/0143674 A1* | 6/2010 | Yoshihara et al. ............ 428/206 |

FOREIGN PATENT DOCUMENTS

| | | |
|---|---|---|
| JP | 2006-88643 A | 4/2006 |
| TW | 557363 | 10/2003 |
| TW | 590886 | 6/2004 |
| TW | M252022 | 12/2004 |

* cited by examiner

*Primary Examiner* — Arnel C Lavarias
(74) *Attorney, Agent, or Firm* — Muncy, Geissler, Olds & Lowe, PLLC

(57) ABSTRACT

An antiglare film with various inner and outer haze includes a transparent substrate, and an antiglare coating layer formed by coating an antiglare coating solution on the transparent substrate. The antiglare coating solution further includes a resin, resin-philic light-scattering particles and resin-phobic light-scattering particles. The resin-philic light-scattering particles and the resin-phobic light-scattering particles respectively have different functional groups on the surfaces thereof. The resin-philic light-scattering particles do not repel the resin and thus are distributed inside the antiglare coating layer. The resin-phobic light-scattering particles repel the resin and thus are distributed on the surface of the antiglare coating layer, so that the inner and outer haze of an antiglare film can be effectively controlled via adjusting the proportion of the resin-phobic to resin-philic light-scattering particles.

6 Claims, 3 Drawing Sheets

ANTIGLARE FILM HAVING RESIN-PHILIC AND RESIN-PHOBIC LIGHT SCATTERING PARTICLES

FIELD OF THE INVENTION

The present invention relates to an antiglare film, particularly to an antiglare film with various ratio of outer haze to inner haze in the same relative composition of particle, resin, and solvent, thereby reducing the complexity of production of antiglare films.

BACKGROUND OF THE INVENTION

For glass and most plastics, about 4-5% of incident light is reflected from the surface. To eliminate disturbance of the external light and increase light transmission to enhance the clarity of display images and the performance of optical components, antireflective and antiglare technologies are usually applied in liquid crystal displays (LCD) or touch panels to prevent the deterioration of visibility by reflective light. However, antiglare technologies are more popular in practical display applications due to cost considerations. An antiglare film comprises three major components: light-scattering particles, binding resin, and a substrate. Similar to LCD diffusers, the light-scattering particles are used to scatter the incident light via the difference in refractive indices between particles/air or particles/resin. Antiglare films are fabricated by coating a solution of light-scattering particles and binding resin on a substrate. After solvent evaporation, the surface of the coating layer becomes rough and uneven due to the light-scattering particles. The haze caused by the surface roughness is called outer haze. On the contrary, the inner haze is caused by the difference in refractive indices of the particles and that of the resin. The inner haze and the outer haze compose the total haze. In applications of LCD diffusers, only the total haze is taken into account. The goal of diffusers is to homogenize the scattering light from the light sources or the light guide plate in a two-dimensional fashion and avoid the occurrence of locally concentrated light. The effect of light homogenization is enhanced when either the inner or outer haze is increased. The surrounding light reflected from the surface of the antiglare film, so the glare was mostly suppressed by the outer haze. The inner haze of the antiglare film will improve the glare of the light emitted from the interior of the display when viewed with the naked eye. The function of the inner haze is similar to the LCD diffuser. Although the outer haze is also helpful to decrease the glare of the light emitted from the interior of the display, the image on the display becomes whitish, and the black density decreases with increasing outer haze. Therefore, the design of the inner and outer hazes of an antiglare film is important to display technologies and more complicated than that of a diffuser.

FIG. 1 shows the structure of a conventional antiglare film. The antiglare film structure comprises a substrate 1 and an antiglare coating layer 2 coated on the substrate 1. The antiglare coating layer 2 further comprises a resin 3 and light-scattering particles 4. In fabricating the antiglare film, an antiglare coating solution is coated on the substrate 1, and the coated film is then placed in an oven to evaporate the solvent in the antiglare coating solution. After that, the coated film is treated with ultraviolet light or placed in an oven to cure the resin 3 in the antiglare coating solution, whereby the antiglare coating layer 2 is formed. When the antiglare coating solution is initially coated on the substrate 1, the light-scattering particles 4 are uniformly distributed in the antiglare coating solution. When the solvent is being vaporized, the resin 3 and the light-scattering particles 4 gradually deposit on the substrate 1 to form the antiglare coating layer 2. When the solvent is being vaporized, the interaction between the solvent and the resin 3, the interaction between the solvent and the light-scattering particles 4, and the interaction between the resin 3 and the light-scattering particles 4 are very complicated. It results that the light-scattering particles 4 are randomly distributed in antiglare layer 2. Therefore, the conventional technology can not control the distribution of the light-scattering particles 4, leading to the variation on the ratio of outer haze to inner haze of the antiglare film.

Although the configuration of an antiglare film is simple and products have been commercialized recently by Japanese manufactures (Dai Nippon Printing Co., Ltd., Nitto Denko Corp., Fuji Photo Film Co., Ltd., Tomoegawa Paper Co., Ltd., and Lintec Corp.), the ratio of outer haze to inner haze is not easily controlled. Some patents, such as U.S. Pat. No. 5,998,013 "Anti-glare Hard Coat Film and Process for Producing the Film", U.S. Pat. No. 6,217,176 "Antiglare Film and Use Thereof", U.S. Pat. No. 6,613,426 "Very fine anti-glare hard coat film", U.S. Pat. No. 6,696,140 "Anti-glare Film and Process for Producing Same Thereof", U.S. Pat. No. 6,896,960 "Anti-glare hard coat film", U.S. Pat. No. 7,033,638 "Antiglare Film and Process for Producing the Same", Taiwan patent No. 557363 "Antiglare Film", Taiwan patent No. 590886 "Method for Fabricating Antiglare Film", and Taiwan patent No. M252022 "Optical Antiglare Film", have revealed that the inner haze and the outer haze can be controlled by the ratio of light-scattering particles to the binding resin, the difference in refractive indices of the light-scattering particles and the binding resin, the diameter of the light-scattering particles, and the thickness of the antiglare coating layer. More light-scattering particles, larger particle sizes, or thinner thickness of antiglare coating layer will cause a higher outer haze due to the formation of more significant concave and convex surfaces. On the other hand, larger differences in refractive indices of the light-scattering particles and the binding resin or thicker thickness of the antiglare coating layer will lead to the increase of inner haze.

In the conventional technologies, the antiglare coating solution must be reformulated if the haze of antiglare films is changed. However, the adjustment of these parameters may result in a significant limitation of the practical application due to the change of the wet-film thickness and the viscosity of the coatings.

Japan patent pub. No. 2006-088643 "Manufacturing Process of Embossed Roll" and U.S. Pat. No. 7,008,066 "Antiglare Film, Process for Producing the Same, and Display Device Using Antiglare Film" use an embossed roll to form micro-embossing on the coating to achieve an antiglare or antireflection effect. Although these methods can fabricate antiglare films with different hazes, different embossed rolls are needed for the different hazes, resulting in the increase of cost. Besides, the above-mentioned prior arts can not change the inner haze.

SUMMARY OF THE INVENTION

The primary objective of the present invention is to solve the problem that the prior arts are difficult to control the inner and outer haze of an antiglare film.

Another objective of the present invention is to provide an easy-to-fabricate and low-cost antiglare film.

To achieve the above-mentioned objectives, the present invention provides an antiglare film with different inner and outer haze, which comprises a transparent substrate and an antiglare coating layer formed via coating an antiglare coating solution on the transparent substrate. The antiglare coating solution further comprises a resin, a solvent, an initiator/hardener, resin-philic light-scattering particles, and resin-phobic light-scattering particles.

The present invention adjusts inner haze and outer haze by varying the proportion between the resin-philic light-scattering particles and resin-phobic light-scattering particles. Thereby, the present invention can fabricate the antiglare films with various ratio of outer haze to inner haze. The resin-philic light-scattering particles and resin-phobic light-scattering particles have the same interior composition but different functional groups on their surface, so that the antiglare film with various inner and outer haze is easy to fabricate and inexpensive.

DETAILED DESCRIPTION OF THE PREFERRED EMBODIMENTS

Figure 1:
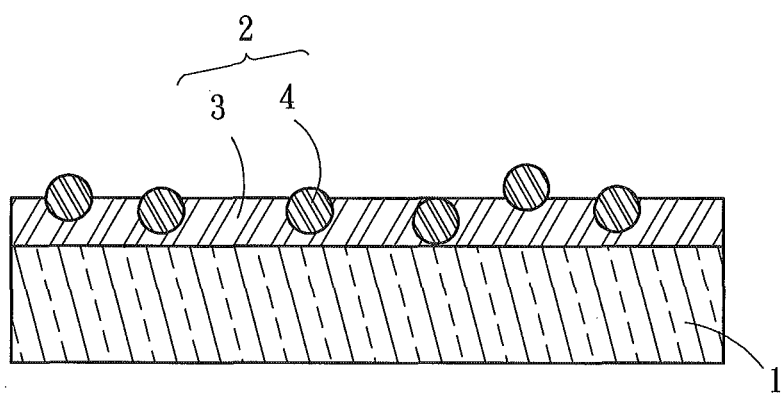
FIG. 1 is a schematic illustration showing a cross-sectional view of a conventional antiglare film.
Figure 2:
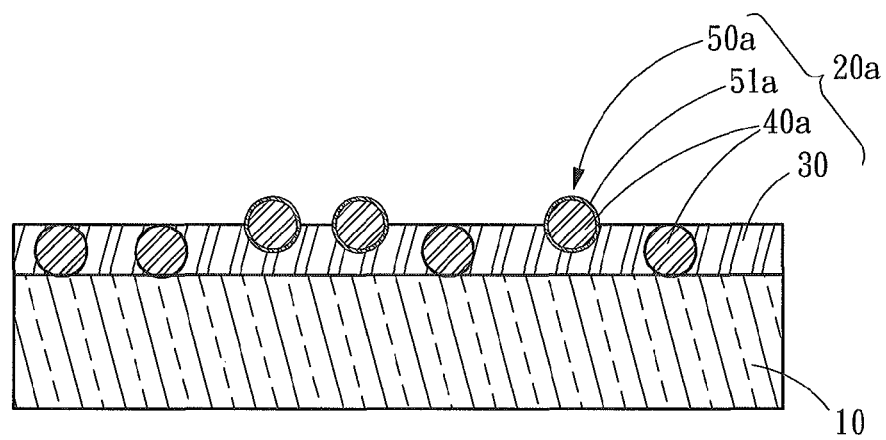
FIG. 2 is a schematic illustration showing a cross-sectional view of an antiglare film according to one embodiment of the present invention.

FIG. 2 shows a cross-sectional view of an antiglare film in an embodiment of the present invention. The antiglare film with various inner and outer haze comprises a transparent substrate 10 and an antiglare coating layer 20a formed via coating an antiglare coating solution on the transparent substrate 10. The antiglare coating solution further comprises a resin 30, a solvent, an initiator/a hardener, resin-philic light-scattering particles 40a and resin-phobic light-scattering particles 50a.

The material of the transparent substrate 10 could be glass, polyacrylate, polycarbonate, polyethylene, polyethylene terephthalate or triacetyl cellulose. The resin 30 is a UV-curable resin or a thermal-curable resin. The UV-curable resin may be a monomer or an oligomer. The monomer could be of isobutyl acrylate, 2-ethylhexyl acrylate, 1,6-hexanediol diacrylate, tripropylene glycol diacrylate, trimethylolpropane diacrylate, dipentaerythritol pentaacrylate, pentaerythritol triacrylate, and dipentaerythritol hexaacrylate. The oligomer is selected from a group consisting of urethane (meth)acrylate oligomers, polyester (meth)acrylate oligomers, or epoxy (meth)acrylate oligomers. The thermal-curable resin is an organic resin, an inorganic resin or a combination thereof. The inorganic resin could be of tetramethyloxysilane, tetraethyloxysilane, or poly(ethyl silicate). The organic resin could be acrylic resin or epoxy resin.

The initiator could be of benzophenone, 1-hydroxy-cyclohexyl-phenyl-ketone, 2-hydroxy-2-methyl-1-phenyl-1-propanone, methyl benzoylformate, triarylsulfonuium hexafluoro-antimonate salts, benzophenone, 1-hydroxy-cyclohexyl-phenyl-ketone, 2-hydroxy-2-methyl-1-phenyl-1-propanone, methyl benzoylformate, and triarylsulfonuium hexafluoro-antimonate salts.

The hardener is selected from a group consisting of hydrogen chloride, nitric acid, ammonia, AIBN (2-2-azobis(isobutyronitrile), ADVN (2,2'-azobis(2,4-dimethylvaleronitrile)), BPO (benzoyl peroxide), methyl tetrahydro phthalic anhydride, diethyltriamine, and dicyandiamide.

The resin-philic light-scattering particle 40a and resin-phobic light-scattering particle 50a can be an organic particle or an inorganic particle. The inorganic particle is made of a material selected from a group consisting of silicon oxide, aluminum oxide, antimony-doped tin oxide, tin oxide, zinc antimonite, antimony pentoxide, indium tin oxide, aluminum-doped zinc oxide, and zinc antimonate. The organic particle is made of a material selected from a group consisting of PMMA (poly(methyl methacrylate)), polystyrene, and benzoguanamine.

The solvent is selected from a group consisting of IPA (isopropyl alcohol), MEK (methyl ethyl ketone), MIBK (methyl isobutyl ketone), EAC (ethyl acetate), BAC (butyl acetate), toluene, cyclohexanone, methanol, and PGMEA (propylene glycol monoethyl ether acetate).

The resin-philic light-scattering particles 40a and resin-phobic light-scattering particles 50a have different functional groups on their surfaces. In one embodiment, the resin-phobic light-scattering particles 50a are formed via modifying the surface of the resin-philic light-scattering particles 40a to include a segregating layer 51a. The resin-philic light-scattering particles 40a and resin-phobic light-scattering particles 50a have a diameter of between 0.5 and 10 μm, preferably between 1 and 5 μm. The resin-philic light-scattering particles 40a do not repel the resin 30 and thus are distributed inside the antiglare coating layer 20a. On the contrary, the resin-phobic light-scattering particles 50a repel the resin 30 and thus are distributed on the surface of the antiglare coating layer 20a. Therefore, the present invention adjusts inner haze and outer haze by varying the proportion between the resin-phobic light-scattering particles 50a and the resin-philic light-scattering particles 40a.

Figure 3:
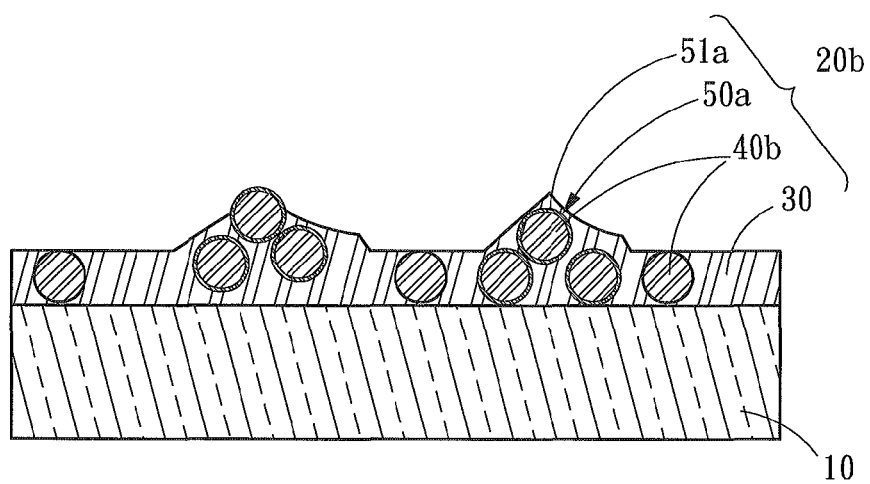
FIG. 3 is a schematic illustration showing a cross-sectional view of an antiglare film according to another embodiment of the present invention.

Referring to FIG. 3, which is another embodiment of the present invention, the resin-phobic light-scattering particles 50b attract each other and are thus likely to form greater aggregates protruding from the surface of the antiglare coating layer 20b. In this embodiment, the present invention provides a rugged surface for the antiglare layer 20b to control the outer haze thereof. As similar to the embodiment in FIG. 2, the resin-philic light-scattering particles 40b are distributed inside the antiglare coating layer 20b to cause the inner haze.

Figure 4:
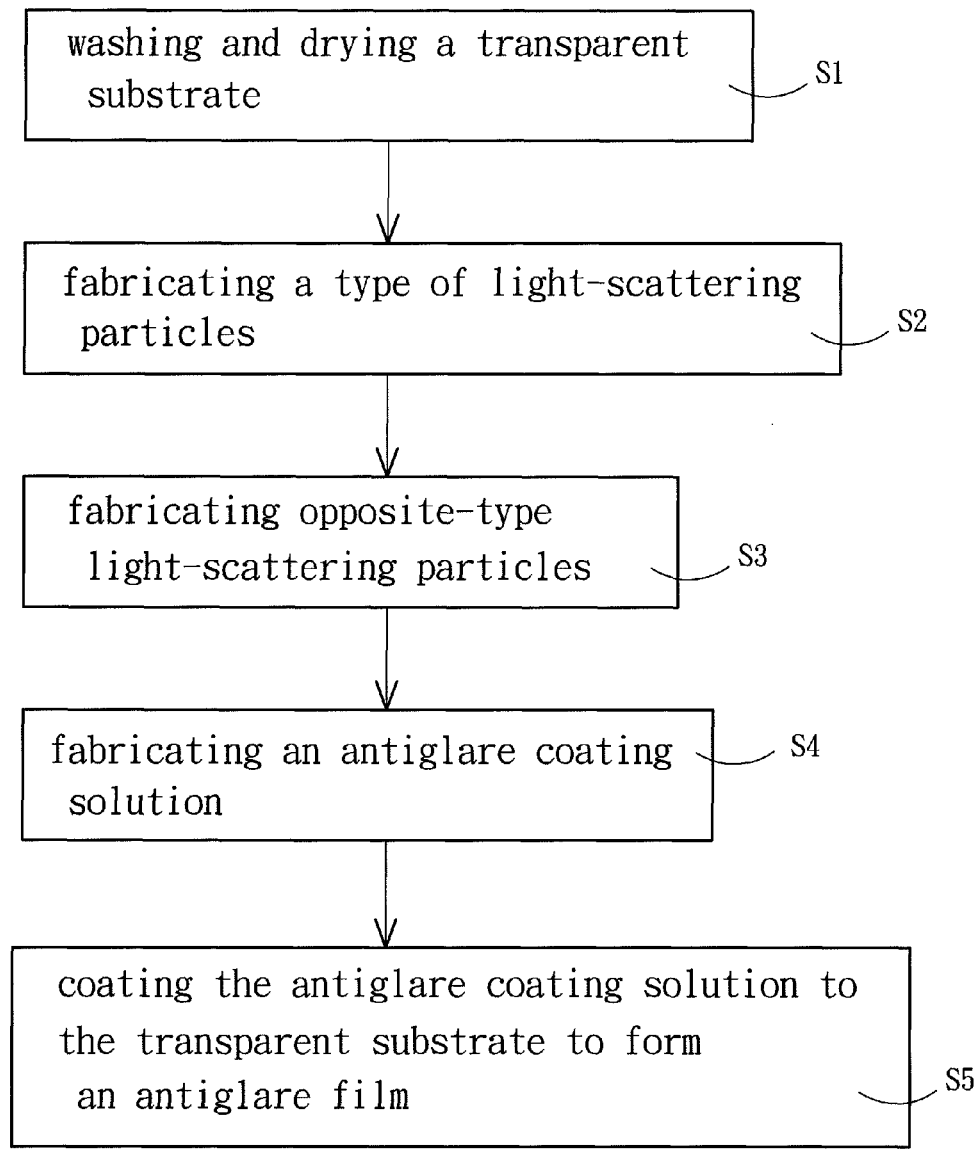
FIG. 4 is a flowchart of a method for fabricating an antiglare film according to a further embodiment of the present invention.

The present invention also provides a method for fabricating an antiglare film with various inner and outer haze. As shown in FIG. 4, which is showing a flowchart of a method for fabricating an antiglare film in an embodiment of the present invention, the method of the present invention comprises the following steps:

Step S1: washing and drying a transparent substrate;

Step S2: fabricating a type of light-scattering particles;

Step S3: fabricating an opposite type of light-scattering particles via modifying the surface of the light-scattering particles fabricated in Step S2, whereby the light-scattering particles fabricated in Step S2 and Step S3 respectively have different repellence to the resin;

Step S4: fabricating an antiglare coating solution via adding the both kinds of light-scattering particles respectively fabricated in Step S2 and Step S3 into a resin by a desired ratio; and Step S5: coating the antiglare coating solution fabricated in Step S4 on the transparent substrate prepared in Step S1, and drying the coated film to form an antiglare film.

It should be particularly mentioned: The method of the present invention does not limit whether to fabricate the resin-philic light-scattering particles or the resin-phobic light-scattering particles first. In other words, the light-scattering particles in Step S2 may be the resin-philic light-scattering particles or the resin-phobic light-scattering particles.

EXAMPLES

The present invention is further demonstrated with the following embodiments.

Pre-Treatment of the Substrate:

A PET substrate is washed with alcohol and subsequently flushed with deionized water, and then dried at an oven.

Fabrication of the Resin-Philic and Resin-Phobic Light-Scattering Particles:

First, 0.86 g of PVP-40 (a product of Sigma-Aldrich Co.) was mixed with 32 ml of alcohol. One hour later, 8 ml of styrene monomer (a product of Sigma-Aldrich Co.) containing 1 wt % of AIBN (a product of Showa Co.) was added into the mixture solution. Then the mixture solution was placed in a three-neck round-bottom flask equipped with a reflux device. Next, nitrogen was pumped into the flask for 30 minutes to drive out oxygen. After that, the flask was placed in a water bath at 70° C. for 24 hours. The as-prepared solution was washed by centrifugation and then dried to obtain a white powder of light-scattering particles (LSP) with 3.4-3.6 μm in diameter, observed by a metallographic microscope (MICROTECH-835).

1 g of LSP were dispersed in 10 ml of ethanol by 10 min ultrasonication. Next, sulfuric acid was added into the suspension until pH value was about 0.25. The mixture solution was treated by 10 min ultrasonication. The suspension was then stirred for 3 h at 70° C. Finally, the product was washed by centrifugation and then dried to obtain the modified light-scattering particles (mLSP).

The present invention is further exemplified with the following three examples.

Example 1

At first, 0.6 g of LSP were added into 4 g of isobutyl alcohol and dispersed in the solution ultrasonically. The suspension solutions were then mixed with 5 g of PETA (a product of Sartomer Co.) and 0.3 g of Irgacure 184 (a product of Ciba-Geigy Co.), and the mixed solution was treated ultrasonically to obtain a coating liquid. The mixture was coated on a PET substrate by a wire-wound rod. The coated film was dried at 70° C. for 3 min and then UV-cured with a dose of 500-600 mJ/cm$^2$ by a UV dryer with a H-type mercury lamp to form an antiglare film.

Example 2

The preparation procedure and the formula were the same as Example 1, except that LSP were replaced by mLSP.

Example 3

The preparation procedure and the formula were the same as Example 1, except that 0.6 g of LSP were replaced by 0.3 g of LSP and 0.3 g of mLSP.

The inner haze, outer haze, total haze, and transmittance were measured by a haze meter (NDH-5000W, Nippon Denshoku) under standard illuminant D65 and in compliance with JIS specification K 7361. The test results are listed on Table.1.

TABLE 1

|  | Total Haze | Transmittance | Inner Haze | Outer Haze |
|---|---|---|---|---|
| Example 1 | 32.4 | 91.3 | 24.6 | 7.8 |
| Example 2 | 41.0 | 88.9 | 15.6 | 25.4 |
| Example 3 | 35.2 | 89.2 | 23.3 | 11.9 |

As shown in Table.1, the present invention can effectively control the inner and outer haze of an antiglare film via adjusting the proportion of untreated light-scattering particles to treated light-scattering particles.

In conclusion, the present invention can control the inner haze and the outer haze of an antiglare film via adjusting the proportion of untreated light-scattering particles to treated light-scattering particles inside the resin 30. Thereby, the present invention can fabricate various antiglare films to satisfy different requirements. Further, both of the treated LSP and the untreated LSP have the same interior composition but only have different function groups. Consequently, the antiglare film of the present invention is easy to fabricate and inexpensive. Therefore, the present invention possesses utility, novelty and non-obviousness.

What is claimed is:

1. An antiglare film with resin-philic light-scattering particles and resin-phobic light-scattering particles, comprising:
   a transparent substrate; and
   an antiglare coating layer formed via coating an antiglare coating solution on the transparent substrate,
   wherein the antiglare coating solution further comprises a resin, a solvent, an initiator, resin-philic light-scattering particles and resin-phobic light-scattering particles, wherein each resin-phobic light-scattering particle includes the resin-philic light-scattering particle and a segregating layer covered on a surface of the resin-philic light-scattering particle, and wherein the resin-philic light-scattering particles are distributed inside the antiglare coating layer, and the resin-phobic light-scattering particles are distributed on a surface of the antiglare coating layer.

2. The antiglare film with various inner and outer haze according to claim 1, wherein the resin-philic light-scattering particles and the resin-phobic light-scattering particles respectively have different functional groups on surfaces thereof.

3. The antiglare film with various inner and outer haze according to claim 1, wherein the resin-phobic light-scattering particles is formed via modifying a surface of the resin-philic light-scattering particles.

4. The antiglare film with various inner and outer haze according to claim 1, wherein the resin is an ultraviolet-curable resin or a thermal-curable resin.

5. The antiglare film with various inner and outer haze according to claim 1, wherein each of the resin-philic light-scattering particle and the resin-phobic light-scattering particle is an organic particle or an inorganic particle, and wherein the inorganic particle is made of a material selected from a group consisting of silicon oxide, aluminum oxide, antimony-doped tin oxide, tin oxide, zinc antimonite, antimony pentoxide, indium tin oxide, aluminum-doped zinc oxide, and zinc antimonate, and wherein the organic particle is made of a material selected from a group consisting of PMMA (poly(methyl methacrylate)), polystyrene, and benzoguanamine.

6. The antiglare film with various inner and outer haze according to claim 1, wherein the resin-philic light-scattering particles and the resin-phobic light-scattering particles have a diameter of between 0.5 and 10 μm.

* * * * *